United States Patent
Greene et al.

(10) Patent No.: US 6,782,396 B2
(45) Date of Patent: Aug. 24, 2004

(54) ALIGNING LEARNING CAPABILITIES WITH TEACHING CAPABILITIES

(75) Inventors: David Perry Greene, Ossining, NY (US); Edith Helen Stern, Yorktown Heights, NY (US); Barry Edward Willner, Briarcliff Manor, NY (US); Philip Shi-lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 09/871,428

(22) Filed: May 31, 2001

(65) Prior Publication Data

US 2002/0184215 A1 Dec. 5, 2002

(51) Int. Cl.[7] .................................................. G06F 7/00
(52) U.S. Cl. .................. 707/104.1; 707/8; 434/350; 434/323; 434/428
(58) Field of Search ................................ 434/350, 323, 434/428; 707/104.1, 8, 1

(56) References Cited

U.S. PATENT DOCUMENTS

| | | | | |
|---|---|---|---|---|
| 4,375,080 A | * | 2/1983 | Barry et al. | 434/238 |
| 6,002,915 A | * | 12/1999 | Shimizu | 434/350 |
| 6,070,160 A | * | 5/2000 | Geary | 707/4 |
| 6,164,975 A | * | 12/2000 | Weingarden et al. | 434/322 |
| 6,302,698 B1 | * | 10/2001 | Ziv-El | 434/323 |
| 6,401,118 B1 | * | 6/2002 | Thomas | 709/224 |
| 6,470,170 B1 | * | 10/2002 | Chen et al. | 434/350 |
| 6,553,310 B1 | * | 4/2003 | Lopke | 701/213 |
| 2002/0076676 A1 | * | 6/2002 | Kyle | 434/178 |
| 2002/0138481 A1 | * | 9/2002 | Aggarwal et al. | 707/6 |
| 2002/0142278 A1 | * | 10/2002 | Whitehurst et al. | 434/350 |
| 2002/0147704 A1 | * | 10/2002 | Borchers | 707/3 |
| 2002/0156779 A1 | * | 10/2002 | Elliott et al. | 707/6 |
| 2002/0192631 A1 | * | 12/2002 | Weir et al. | 434/350 |

* cited by examiner

*Primary Examiner*—John Breene
*Assistant Examiner*—Kuen S. Lu
(74) *Attorney, Agent, or Firm*—Duke W. Yee; Stephen C. Kaufman; Stephen R. Tkacs

(57) ABSTRACT

A method, program and system aligns students and teachers according to dominant learning and teaching styles. The invention creates a menu of learning styles, and a second menu of teaching styles. Students are then tested using each learning style contained in the first menu, and the test scores are entered into a student database. Teachers are also tested using each teaching style contained in the second menu, and a database is then created for the teacher test scores. Using the student and teacher test scores, the system calculates a best-fit match between students and teachers according to corresponding learning and teaching styles.

27 Claims, 4 Drawing Sheets

ROBERT JONES
400

|  | VISUAL | VERBAL | HANDS ON | STRUCTURED | NON STRUCTURED | HIGH REPITITION | SLOW PACE |
|---|---|---|---|---|---|---|---|
| LANGUAGE | 0.6 | 0.9 | 0.2 | 0.4 | 0.6 | 0.8 | 0.7 |
| MATH | 0.9 | 0.4 | 0.5 | 0.7 | 0.3 | 0.8 | 0.9 |
| GEOGRAPHY | 0.9 | 0.8 | 0.3 | 0.5 | 0.5 | 0.4 | 0.4 |
| SCIENCE | 0.8 | 0.7 | 0.9 | 0.8 | 0.3 | 0.6 | 0.6 |
| HISTORY | 0.2 | 0.8 | 0.3 | 0.7 | 0.5 | 0.2 | 0.4 |

ALIGNING LEARNING CAPABILITIES WITH TEACHING CAPABILITIES

BACKGROUND OF THE INVENTION

1. Technical Field

The present invention relates generally to computer databases, and more specifically to optimization of matching categories within a database.

2. Description of Related Art

In today's society, there is tremendous pressure to improve educational results, so as to have better educated citizens. There are a number of approaches currently underway to improve education. These approaches include longer schools days and longer school years, frequent standardized testing and review, sorting classes by ability, not sorting classes by ability, and cooperative education (wherein students help teach each other). However, additional creative approaches may also be needed.

Each student has a specific style of learning. For example, some students learn better when subject material is presented to them in a visual manner, whereas other students learn better with hands on experience. Some students can learn something the first time they are exposed to it, and others require more repetition. As another example, some students require a very structured learning environment, whereas other students perform better when given more independence and responsibility.

Similarly, different teachers have different teaching styles. Master teachers are professionals and understand the plurality of learning styles and will attempt to adapt to those styles as needed. However, even master teachers will have natural preferences for particular teaching styles. Currently, there is no method for efficiently and systematically matching students and teachers with compatible learning and teaching styles.

Therefore, it would be desirable to have a to have a method for systematically matching students with a predominant learning style with teachers using a compatible teaching style.

SUMMARY OF THE INVENTION

The present invention provides a method, program and system for aligning students and teachers according to dominant learning and teaching styles. The invention comprise creating a menu of learning styles, and a second menu of teaching styles. Students are then tested using each learning style contained in the first menu, and the test scores are entered into a student database. Teachers are also tested using each teaching style contained in the second menu, and a database is then created for the teacher test scores. Using the student and teacher test scores, the system calculates a best-fit match between students and teachers according to corresponding learning and teaching styles.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
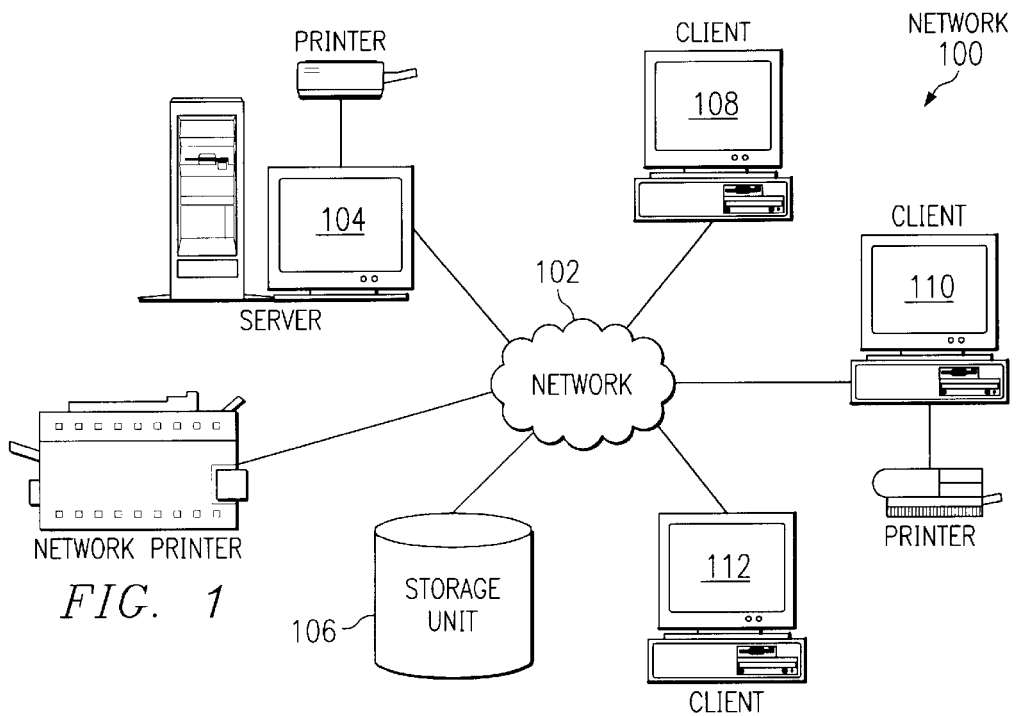
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 maybe, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
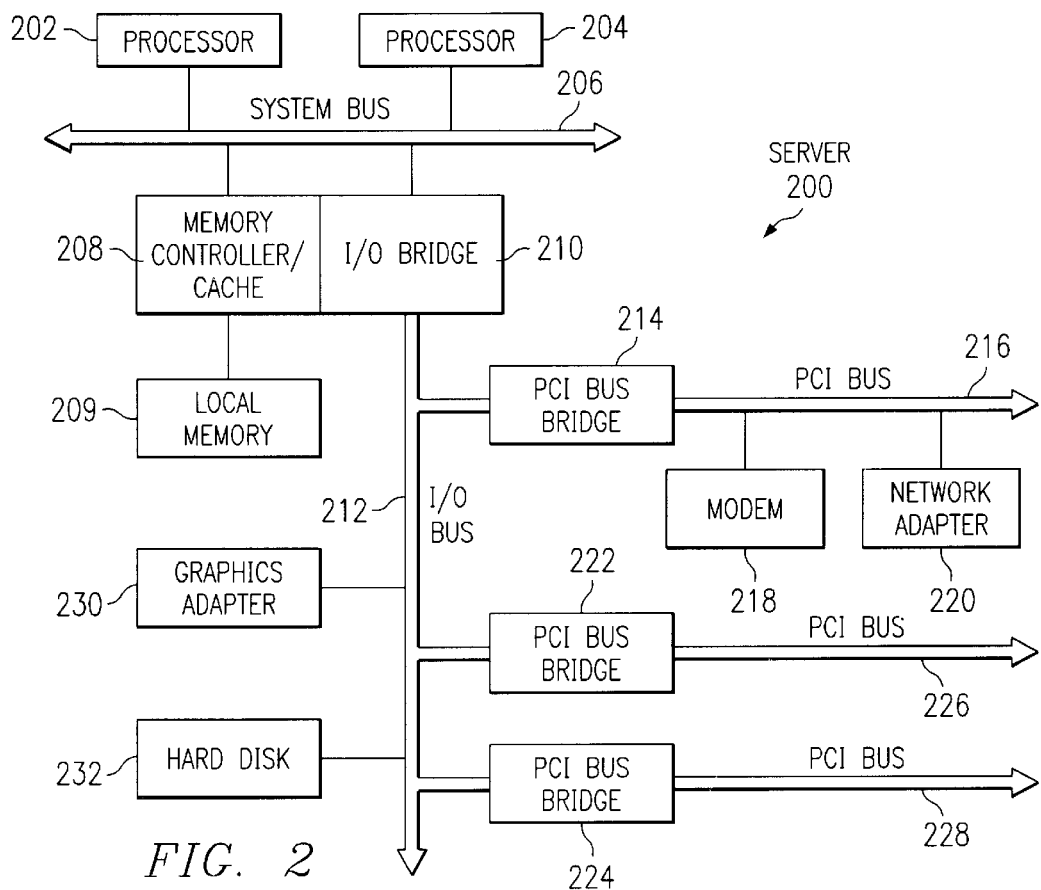
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figures 3, 4:
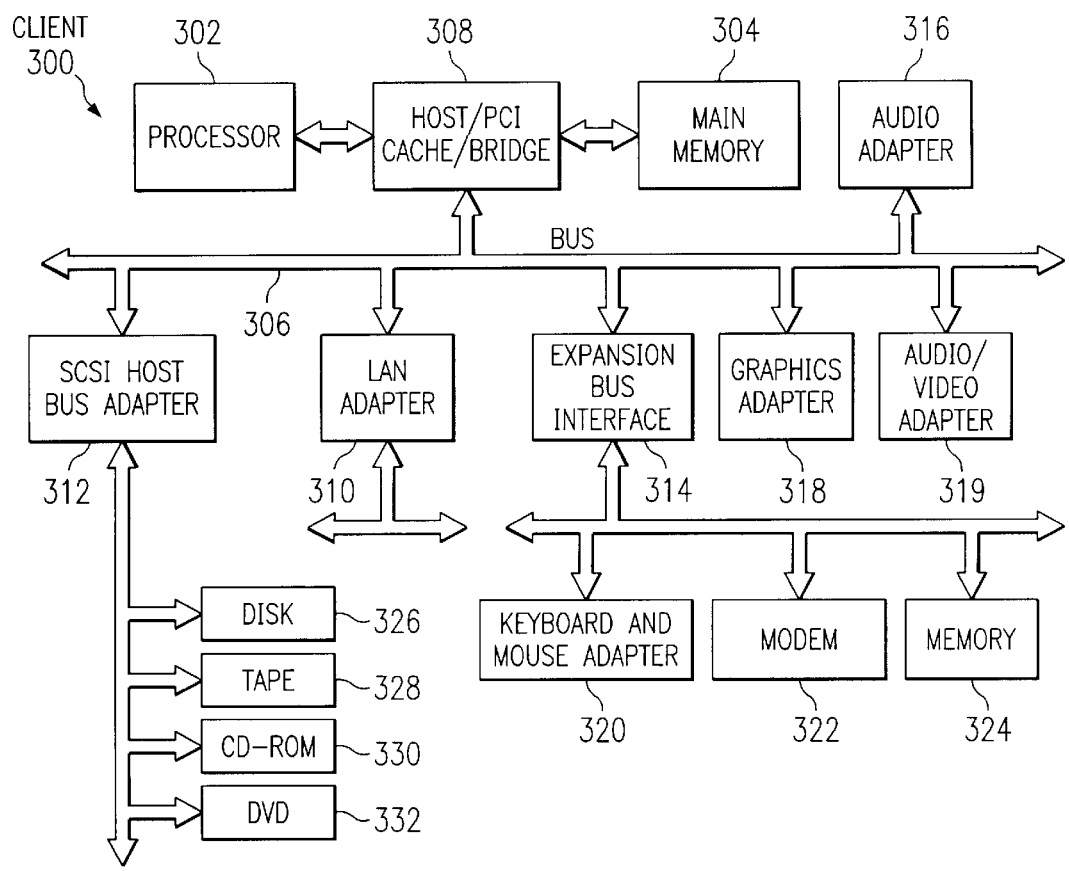
FIG. 3 depicts a block diagram illustrating a data processing system in which the present invention may be implemented.
FIG. 4, a diagram illustrating a database of student learning styles is depicted in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, CD-ROM drive 330, and DVD drive 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention is a method of education in which students are tested and observed in order to understand their respective learning styles. The students are then placed in classes according to learning style. These classes are then taught by teachers that have correlated preferred teaching styles.

Referring to FIG. 4, a diagram illustrating a database of student learning styles is depicted in accordance with the present invention. This database 400 is for a single student and is an example of how a student's proficiency in different learning styles can be tracked and compared among different subject areas. Though students will have a predominant learning style in which they excel, most students are likely to be proficient in several learning styles to one degree or another. For example, referring to the scores in database 400, Robert Jones has achieved high scores in geography using both visual and verbal means. In addition, a particular student may rely on different learning styles for different subject areas. Referring again to database 400, when visual methods are employed, Robert scored very well in math but poorly in history. However, when verbal methods are employed, Robert scores well in history but is weaker in math. The scores that are listed in database 400 are used simply as examples to illustrate relative performance and do not correspond to any particular testing method. In addition, different types of scoring may be used.

Students may be tested by several means, as will be explained in greater detail below. Examples include standardized tests or personal observation by education specialists. Considering the diverse range of learning styles that might be tested, it is likely that several testing methods may have to be used. The types and number of learning styles tested will depend on the educational program of a particular school or district, as well as available resources. The learning styles depicted in FIG. 4 are merely examples. Proficiency in different learning styles can then be evaluated for particular academic subject areas. These subject areas will most likely be chosen according to the curriculum of the next school period (i.e. semester or year).

The databases for individual students may be combined to create a three-dimensional database. This three-dimensional database could cover an entire school grade (e.g. fourth grade).

A similar database may be constructed for teachers, in which proficiency in different teaching styles is tested and evaluated. The only significant different between the teacher and student databases in the number of academic subject tested. The testing of teachers would most likely be restricted to the subject(s) taught by a particular teacher. As with the students, the teacher could be tested using a variety of methods, including standardized testing and personal observation. Again, the nature and extent of the testing will depend on a school's academic program and available resources.

Figure 5:
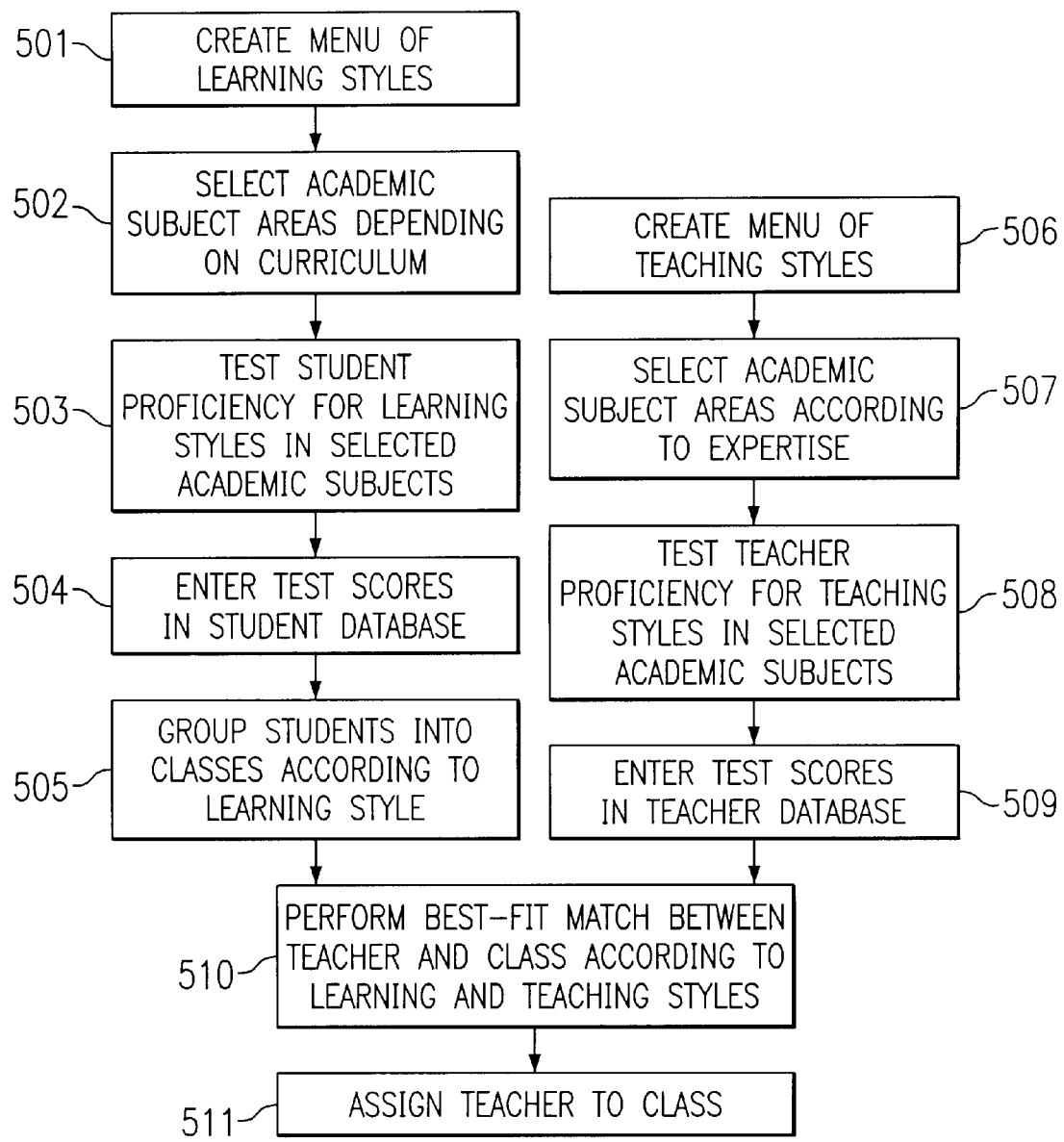
FIG. 5 depicts a flowchart illustrating a method for matching students and teachers according to respective learning and teaching styles in accordance with the present invention.

Referring now to FIG. 5, a flowchart illustrating a method for matching students and teachers according to respective learning and teaching styles is depicted in accordance with the present invention. This process flow allows schools to match learning and teaching styles as effectively as possible within the constraints facing each school or district. The first step in the process is to create a menu of learning and teaching styles (step 501). Examples of these styles include visually dominant, verbally dominant, practical hands-on (tactile/kinesthetic), highly structured environment versus unstructured, fast pace versus slow pace, high repetition versus low repetition, and whole-part versus part-whole. There are many other possible classifications. Some of the learning styles might be mutually exclusive of each other (e.g. verbal versus visual), while some categories may be combined (e.g. visual/unstructured lesson plan).

A parallel step comprises creating a menu of teaching styles (step 506). Ideally, there should be a one-to-one correspondence between the categories of learning and teaching styles. However, limited resources may require some categories to be collapsed together. For example, visually based teaching may also have a high carryover to practical hands-on teaching. Because the number of teachers is usually the limiting factor, teaching styles might have to be grouped together (e.g. visual/hands-on) during the creation of the teaching style menu in step 506. Though limits on the number of teachers may be taken into account later in the process (when matching students and teachers), addressing these limitations from the start may simplify later steps. Such decisions will need to be made by administrators according to circumstances.

After the menu of learning styles is created, a list of subject matter areas is created (step 502). These subject areas will most likely chosen depending on the curriculum of the coming school period. In addition, the list of subjects might be narrow or broad depending on the interval between testing. For example, if testing is performed once every two or three years, the subjects tested for learning style might be fairly broad. In such a case, basic academic categories such as math, language arts, and social sciences may be used. However, if the testing occurs more frequently (i.e. yearly), the tested subject areas might be more narrowly tailored for the upcoming academic period.

The parallel step for teachers is to select subject areas corresponding to a teachers expertise and qualifications (step 507). Depending on the grade level (i.e. primary education versus secondary), teachers will specialize in particular areas of expertise. However, many teachers are qualified to teach several subjects (i.e. science and math). And at lower grade levels, a single teacher will often teach most, if not all, subjects.

Students are then tested to determine their dominant learning styles for each of the selected academic subjects (step 503). As stated above, this may be done with standardized test, personal observation by a testing expert, or a combination of methods. In fact, testing the correspondence between learning style and subject area may be incorporated as part of regular placement testing. The results of these tests are then entered into the student database (step 504). The use of databases, such as the one in FIG. 4, helps considerably in handling and processing the vast amount of data generated by such detailed testing.

Figure 6:
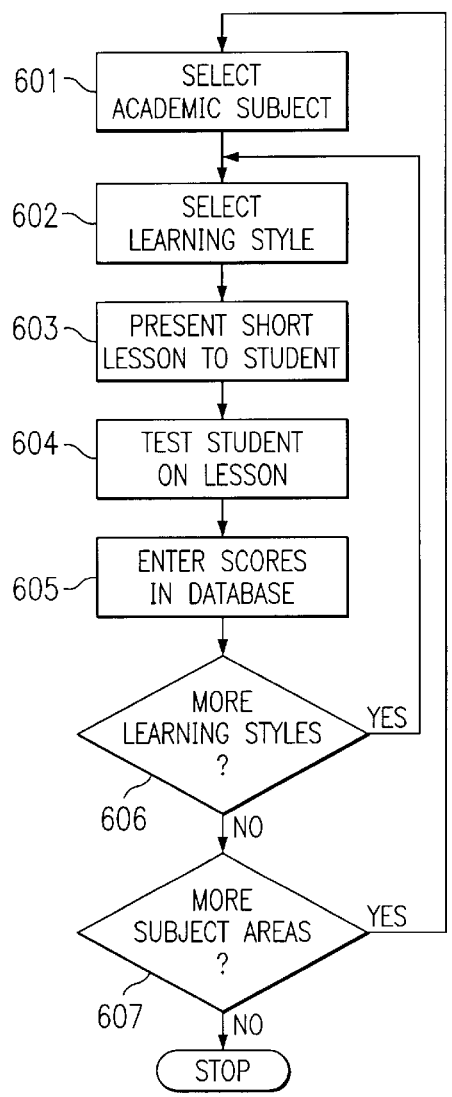
FIG. 6 depicts a flowchart illustrating the process of student testing in accordance with the present invention.

Referring to FIG. 6, a flowchart illustrating the process of student testing is depicted in accordance with the present invention. First, an academic subject area (e.g. math) is chosen (step 601). Next a particular learning style is selected (e.g. visual dominant) (step 602). A short lesson plan is then presented to the student (step 603). The content of the lesson is based on the subject area, and the format of the lesson is based on the learning style being tested.

After the student has studied the lesson, the system tests the student on the material just covered (step 604). The testing could take many forms, depending on the nature of the subject area and the style of learning. For example, the test could be multiple choice, short answer, essay, or a combination. The student's answers are then graded and the score is entered into the student's database (step 605).

The system then determines if there are any additional learning styles to be tested for that particular subject area (step 606). If there are more learning styles to be tested, the system returns to step 602 and selects a new style. If all specified learning styles have been tested for that subject area, the system then determines if there are more subject areas to be tested (step 607). If more subjects remain to be tested, the system returns to step 601 and selects the next subject. If there are no more subjects remaining to be tested, the process ends.

The steps in FIG. 6 may be carried out using individual work stations, similar to client machine 300 in FIG. 3. This would facilitate testing of many students at once and enable faster processing of scores. However, the evaluation of some learning styles, such as practical hands-on learning, may not lend themselves to online testing, and instead require in-person observation.

Referring back to FIG. 5, based on the results of the testing, students may then be grouped into classes according to their dominant learning styles (step 505). Because of limited resources (most notably number of teachers), it is unlikely that a school will be able to create a separate class within each subject area which corresponds to a particular learning style. For example, if five learning styles are tested, it is unlikely that a school will have five separate math classes for each learning style. However, because students will likely respond well to several teaching style, a best fit may be determined from the test scores in the student database.

Figure 7:
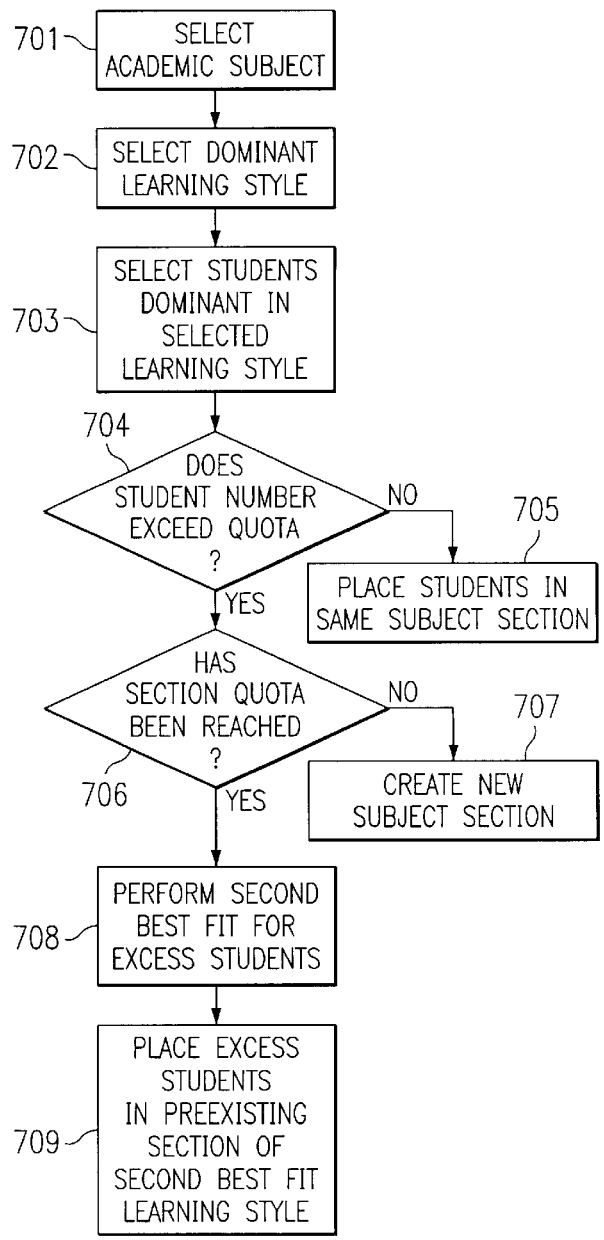
FIG. 7 depicts a flowchart illustrating the process of grouping students according to dominant learning style is depicted in accordance with the present invention.

Referring to FIG. 7, a flowchart illustrating the process of grouping students according to dominant learning style is depicted in accordance with the present invention. In addition to test scores, factors such as number of students, number of teachers, and class schedules for other subjects may be used in calculating how students are grouped together. The optimized grouping of students might change if any of the determining factors changes.

When performing a best bit for learning styles while organizing class sections, the system must first select a subject (e.g. math, science, history) (step 701). A particular learning style is then chosen as a parameter (step 702). Ideally, the menu of learning styles used when grouping students is the same as the menu used during testing. Next, the system selects the students who are dominant in the selected learning style (step 703). For example, referring back to FIG. 4, if the selected subject is math, and the selected learning style is visual dominant, the system would select Robert Jones for that math section, because Robert achieved his best math scores using visual dominant learning methods.

When all of the students who are dominant in the learning style have been selected, the system must then determine if the number exceeds a specified quota for section size (step 704). This quota might be set according to factors such as desired student/teacher ratio, size of classrooms, or any number of practical concerns a school might have in regard to the number of students in each section. If the number of selected students does not exceed this ratio, all of the students may then be placed in the same section (step 705). If the number of students does exceed the quota, some of them will have to be placed in another section.

The system determines if the quota for total class sections has been reached (step 706). For example, a school may not be able to schedule more than three sections for Trigonometry. This restriction of section number may be due to factors such as the number of qualified teachers or scheduling of other subjects. In addition, each learning style may have its own section quota. For example, the Physical Science course may have a quota of three sections: one for visually dominant students, one for verbal, and one for hands-on (kinesthetic) dominant students.

If the section quota has not yet been reached, then another section is created for that subject/learning style combination (step 707). However, it is unlikely that a school will be able to devote more than one class section to a particular learning style. Therefore, if another section cannot be created for a particular subject/learning style combination, the system performs a second best fit for a student's next strongest learning style (step 708) and places the student in a preexisting section using the second-best-fit learning method (step 709). Using FIG. 4 as an example, in science, Robert achieved his best score (0.9) using a hands-on learning style. However, if the hands-on class section is full, Robert would be placed in the visual dominant section, since that is Robert's second best learning style (0.8).

The grouping process illustrated in FIG. 7 is a very simple example. Some schools might have to perform third or fourth best fits in order to place students, depending on resources. In addition, some learning style may be combined. For example, if statistical analysis reveals that students who excel using the visual dominant style usually achieve their second best scores in hands-on learning (and visa versa), these two learning styles may be combined in step 702. This approach would be particularly helpful for schools with limited teaching resources.

Referring back to FIG. 5, teachers are also tested to determine their most effective teaching style in their respective area(s) of expertise and qualification (step 508). This testing is likely to occur less frequently than student testing. Such testing might be incorporated into the initial certification testing for teachers, and could also be included with continuing education requirements for teachers, especially if a teacher branches out into a new subject. Whereas students are presented with a lesson and then tested on its contents, a teacher is given a lesson plan in a selected subject, which the teacher then presents to an observer. The teacher may be explicitly instructed to use a particular teaching style, or the teacher may simply be allowed to present the lesson, while a test administrator notes the dominant teaching style(s) naturally employed by the teacher. As with students, teachers will have a dominant teaching style but will also be proficient in other styles as well. Based on the selected parameters, a score is determined for the teacher and entered into a teacher database (step 509). These parameters might include a standardized list of characteristics associated with a particular teaching style, as well as instructions to test administrators on how to grade each characteristic. The testing of dominant teaching styles may be a slower process than student testing and rely more on observation and assessment by supervisors, rather than standardized testing, such as the method illustrated in FIG. 6.

Based on the best-fit grouping of students and the teaching style scores, a best-fit match is made between teachers and student groups (step 510). In an alternate embodiment of the present invention, the grouping of students in step 505 may be performed during the best-fit matching of students and teachers in step 510. This alternative approach might be necessary depending on the available teaching staff. For example, if a school or district has a shortage of teachers, it may be necessary to determine the teaching strengths of the available teachers in order to determine if there are even any teachers available that correspond to the dominant learning styles of the majority of students. This decision is context dependent and gives schools additional flexibility in applying the present invention.

As stated above, the classification of teaching styles might require some categories of styles to be combined. The decision to combine categories of teaching styles might be made at the beginning when the menu is created in step 506, or later when matching teachers and students, especially if learning styles are combined during the process of grouping students. The decision will likely be based on future knowledge of resources. For example, if a school district is anticipating a shortage of teaching for the next several years, it may incorporate this factor into the teaching style menu. However, if changes in available resources are forthcoming, decisions might be delayed. All of this depends on the time needed to complete the steps in FIG. 5 and the interval between testing. After a best fit is determined for teachers and students, teachers are assigned to their respective classes and subject sections (step 511).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Although the depicted illustrations show the mechanism of the present invention embodied on a single server, this mechanism may be distributed through multiple data processing systems. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for aligning students and teachers according to dominant learning and teaching styles, the method comprising:

creating a first menu comprising categories of learning styles;

creating a second menu comprising categories of teaching styles;

testing students using at least one learning style contained in the first menu and creating a first database comprising student scores corresponding to the tests, wherein each student score is associated with a given learning style contained in the first menu;

testing teachers using at least one teaching style contained in the second menu and creating a second database comprising teacher scores corresponding to the tests, wherein each teacher score is associated with a given teaching style contained in the second menu;

calculating a best fit match between teachers and students, wherein the best fit match is based on student scores contained in the first database and teacher scores contained in the second database.

2. The method according to claim 1, wherein the categories of learning styles comprise at least one of the following:

visual;

verbal;

tactile;

high repetition;

low repetition;

fast paced;

slow paced;

highly structured; and unstructured.

3. The method according to claim 2, wherein at least two or more categories of learning styles may be combined.

4. The method according to claim 1, wherein the categories of teaching styles comprise at least one of the following:

visual;

verbal;

tactile;

high repetition;

low repetition;

fast paced;

slow paced;

highly structured; and unstructured.

5. The method according to claim 4, wherein at least two or more categories of teaching styles may be combined.

6. The method according to claim 1, wherein the step of testing students and creating a database of student scores further comprises:

selecting an academic subject;

selecting a category from the menu of learning styles;

presenting a lesson to a student, wherein the content of the lesson corresponds to the selected subject area and the format of the lesson corresponds to the selected learning style;

testing the student on the content of the lesson; and entering test scores into a student database.

7. The method according to claim 6, wherein the step of testing the student comprises at least one of the following methods:

multiple choice;

short answer;

essay; and one-to-one personal evaluation.

8. The method according to claim 1, wherein the step of testing teachers and creating a database of teacher scores further comprises:

selecting an academic subject corresponding to a teacher's expertise;

providing the teacher with a lesson plan, wherein the contents of the lesson corresponds to the selected subject;

observing the teacher present the lesson;

scoring the teacher's presentation, according to specified parameters for categories of teaching styles; and entering the scores into a teacher database.

9. The method according to claim 8, further comprising specifying a particular teaching style in which the lesson is to be presented.

10. The method according to claim 8, wherein the step of observing the teacher present the lesson plan is by means of in-person observation and evaluation.

11. The method according to claim 1, further comprising grouping students into classes according to learning style.

12. A computer program product in a computer readable medium for use in a data processing system, for aligning students and teachers according to dominant learning and teaching styles, the computer program product comprising:

instructions for creating a first menu comprising categories of learning styles;

instructions for creating a second menu comprising categories of teaching styles;

instructions for testing students using at least one learning style contained in the first menu and creating a first database comprising student scores corresponding to the tests, wherein each student score is associated with a given learning style contained in the first menu;

instructions for testing teachers using at least one teaching style contained in the second menu and creating a second database comprising teacher scores corresponding to the tests, wherein each teacher score is associated with a given teaching style contained in the second menu;

instructions for calculating a best fit match between teachers and students, wherein the best fit match is based on student scores contained in the first database and teacher scores contained in the second database.

13. The computer program product according to claim 12, wherein the categories of learning styles comprise at least one of the following:

visual;

verbal;

tactile;
high repetition;
low repetition;
fast paced;
slow paced;
highly structured; and
unstructured.

14. The computer program product according to claim 13, wherein at least two or more categories of learning styles may be combined.

15. The computer program product according to claim 12, wherein the categories of teaching styles comprise at least one of the following:
visual;
verbal;
tactile;
high repetition;
low repetition;
fast paced;
slow paced;
highly structured; and
unstructured.

16. The computer program product according to claim 15, wherein at least two or more categories of teaching styles may be combined.

17. The computer program product according to claim 12, wherein the instructions for testing students and creating a database of student scores further comprise:
  instructions for selecting an academic subject;
  instructions for selecting a category from the menu of learning styles;
  instructions for presenting a lesson to a student, wherein the content of the lesson corresponds to the selected subject area and the format of the lesson corresponds to the selected learning style;
  instructions for testing the student on the content of the lesson; and
  instructions for entering test scores into a student database.

18. The computer program product according to claim 17, wherein the instructions for testing the student comprise at least one of the following methods:
  multiple choice;
  short answer; and
  essay.

19. The computer program product according to claim 12, wherein the instructions for testing teachers and creating a database of teacher scores further comprise:
  instructions for selecting an academic subject corresponding to a teacher's expertise;
  instructions for providing the teacher with a lesson plan, wherein the contents of the lesson corresponds to the selected subject;
  instructions for providing a test administrator with scoring parameters for each category in the menu of teaching styles; and
  instructions for receiving and entering test scores into a teacher database.

20. The computer program product according to claim 19, further comprising instructions for specifying a particular teaching style in which the lesson is to be presented.

21. The computer program product according to claim 12, further comprising instructions for grouping students into classes according to learning style.

22. A system for aligning students and teachers according to dominant learning and teaching styles, the system comprising:
  a first register which maintains a first menu comprising categories of learning styles;
  a second register which maintains a second menu comprising categories of teaching styles;
  a first processing component which tests students using at least one learning style contained in the first menu and creates a first database comprising student scores corresponding to the tests, wherein each student score is associated with a given learning style contained in the first menu;
  a second processing component which tests teachers using at least one teaching style contained in the second menu and creates a second database comprising teacher scores corresponding to the tests, wherein each teacher score is associated with a given teaching style contained in the second menu;
  a third processing component which calculates a best fit match between teachers and students, wherein the best fit match is based on student and scores contained in the first database teacher scores contained in the second database.

23. The system according to claim 22, wherein the processing component which testes students and creates a database of student scores further comprises:
  a first selector which selects an academic subject;
  a second selector which selects a category from the menu of learning styles;
  a display component which presents a lesson to a student, wherein the content of the lesson corresponds to the selected subject area and the format of the lesson corresponds to the selected learning style;
  a processor which tests the student on the content of the lesson; and
  a register which enters test scores into a student database.

24. The system according to claim 23, wherein the processor which tests the student uses at least one of the following methods:
  multiple choice;
  short answer; and
  essay.

25. The system according to claim 22, wherein the processing component which tests teachers and creates a database of teacher scores further comprises:
  a selector which selects an academic subject corresponding to a teacher's expertise;
  a first display component which provides the teacher with a lesson plan, wherein the contents of the lesson corresponds to the selected subject;
  a second display component which provides a test administrator with scoring parameters for each category in the menu of teaching styles; and
  a register which receives and enters test scores into a teacher database.

26. The system according to claim 25, further comprising a display component which specifies a particular teaching style in which the lesson is to be presented.

27. The system according to claim 22, further comprising a processing component which groups students into classes according to learning style.

* * * * *